INVENTORS
Clyde A. Crowley
William M. Langdon
Demetrios V. Louzos
James H. Conolly
By: Wallenstein & Spangenberg attys

United States Patent Office 2,921,111
Patented Jan. 12, 1960

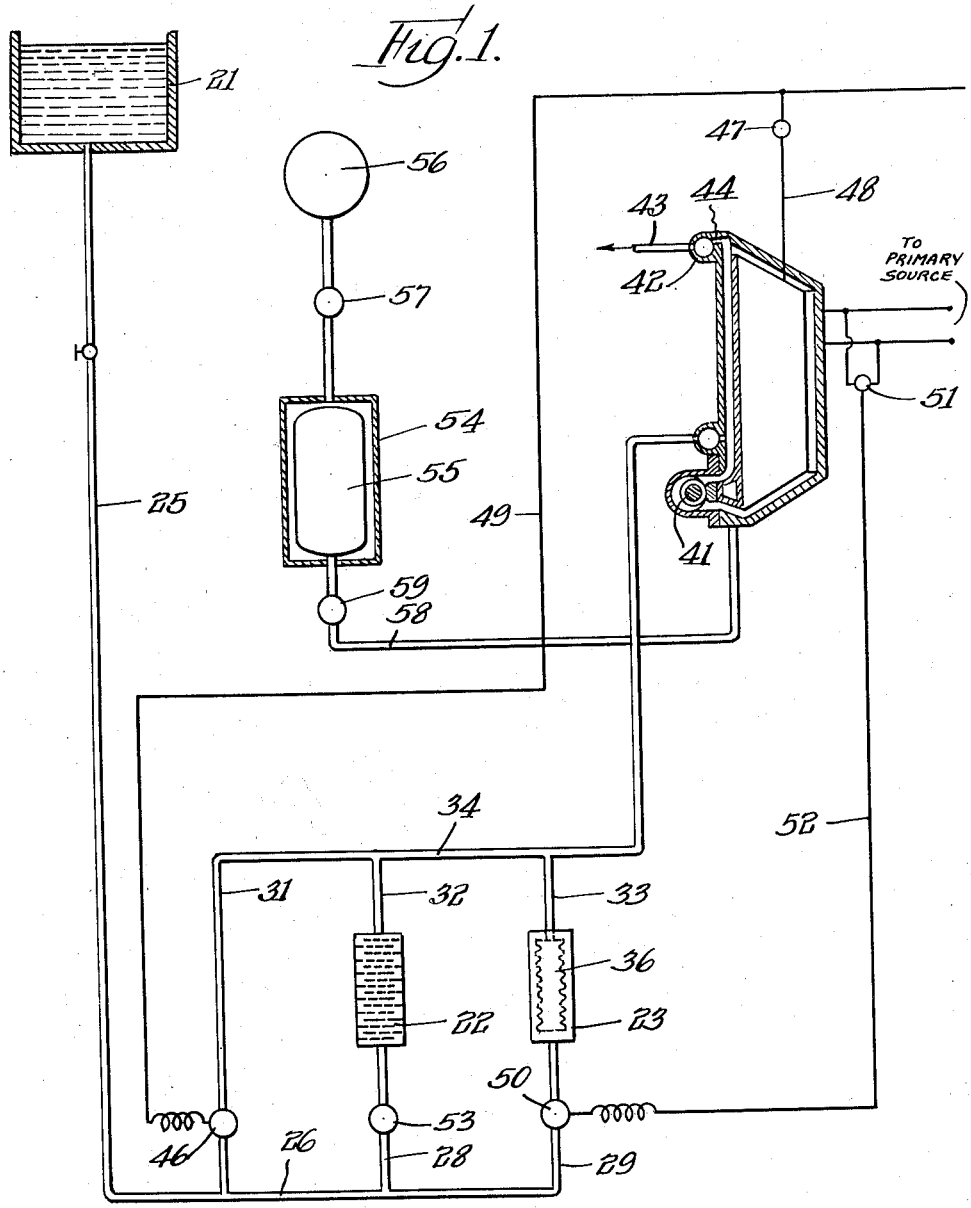
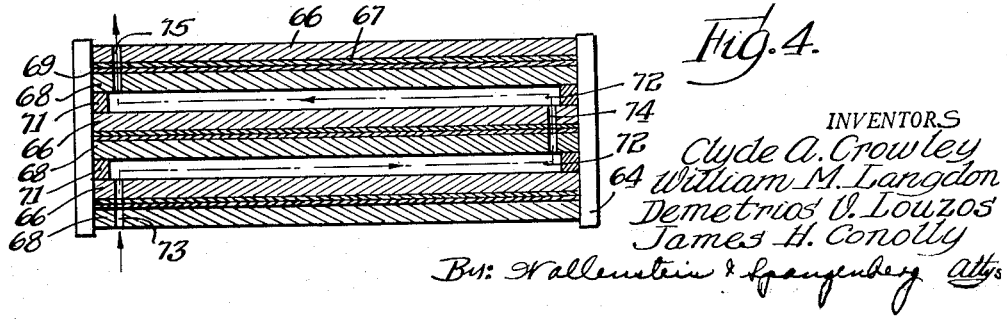

2,921,111
BATTERY CELLS

Clyde A. Crowley, Wilmette, William M. Langdon, Algonquin, Demetrios V. Louzos, Waukegan, and James H. Conolly, Wheaton, Ill., assignors, by mesne assignments, to Graham, Savage and Associates, Inc., Kalamazoo, Mich., a corporation of Illinois Application February 2, 1953, Serial No. 334,434

9 Claims. (Cl. 136—100)

This invention relates to improvements in primary battery cells which are capable of delivering energy at high rates. It enables the obtention of electrical energy at high efficiency rates by transformation of chemical energy in a novel and highly effective manner.

The usual types of cells or batteries, for example, the dry cell and the storage battery, while of marked utility for certain purposes, have a number of marked deficiencies which militate against their use for a variety of other purposes, one of such latter typical instances being as sources of large reserve power for flood lighting of isolated emergency landing fields or emergency starting of heavy mobile equipment. Other types of primary batteries which have been suggested for various uses employ zinc or similar metals and carbon or platinum as electrodes, the electrolyte being stationary and fluid in character and comprising a chromic acid radical, usually in the form of chromates and dichromates. Such latter batteries have been capable of producing only low current drains and, because of their inefficiency and short shelf life, they have been entirely supplanted by the Le Clanché or air depolarized cells. In general, the internal resistances of at least most of such cells as have been discussed above are extremely high and they are, from a practical standpoint, completely lacking in feasibility for such purposes as those referred to above and for many other uses as well.

Various types of so-called "fuel cells" have been proposed in the past to meet the defects which characterize conventional primary cells in relation to inability to operate them at high current densities over appreciable periods of time. All of such cells, so far as we are aware, have many important practical defects so that even the best of them has gone into only limited experimental use and in only limited environments.

In conventional cells or battery systems, the by-products of the chemical reactions as a result of which electrical energy is obtained accumulate in the cell or system. The effect thereof is that the ability of the cell or system to deliver electrical energy declines and the declination is at least to some extent, generally speaking, a function of the time of operation of the cell or system. In the case of cell systems to which the present invention relates, the by-products of the chemical reactions, in the form of spent electrolyte and cell gases which are generated, are, more or less continuously, discharged. The composition of the electrolyte is advantageously maintained substantially constant, within certain reasonable limits, and, therefore, the output of the cell is essentially constant and the cell is capable of practically continuous operation at substantially maximum efficiency. Other and important advantages of cells made in accordance with the present invention will be pointed out below in connection with the detailed description of the invention.

In general, batteries made in accordance with our invention utilize cells having inlet and outlet ports and the liquid electrolyte, described in detail below, is circulated and recirculated through the cells, such circulation and recirculation being accomplished by pump means. Each cell has mounted therein a reducing metal electrode and an inert electrode spaced therefrom. The cell system provides reservoirs for water; for a water-soluble source of hexavalent chromium ions such as water-soluble chromates and dichromates, or chromyl chloride ($CrO_2Cl_2$), but particularly chromium trioxide ($CrO_3$); and for an inorganic acid which does not form a protective coating on the reducing metal electrode and which is not reduced nor reacted upon by chromium trioxide or chromic acid solutions. The cells reaction is exothermic in nature and, therefore, a thermostatic controlled valve is employed for controlling the admission of water to the cell from the water reservoir by throttling or metering the same so as to regulate the cell temperature within desired limits. The system also includes a voltage controlled valve for controlling the rate of feed of the inorganic acid to the cell by throttling or metering the same in response to voltage delivered by the cell whereby to maintain a substantially constant and uniform cell output. Means is provided to pass water at a substantially constant rate of feed through the chromium trioxide contained in the chromium oxide reservoir whereby to control the rate of feed of chromic acid solution to the system. A pipe line or manifold or the like is provided wherein the water, the chromic acid formed from the chromium trioxide, and the inorganic acid commingle to form the cell electrolyte before the admission thereof to the cell. An overflow line is operatively connected to the cell through which spent electrolyte and cell gases discharge. The cell requires a forced circulation of electrolyte past the electrodes in order to produce the high current drains which, for example, can be of the order of 5 to 10 amperes per square inch of reducing metal electrode surface, at voltages, per cell, up to 1.5 and above, depending upon the reaction efficiency which is desired to be maintained. Indeed, batteries made in accordance with the present invention are capable of delivering enormous power over short periods of time, for instance, 60 kw. over a 15 minute period, in a battery weighing about 400 pounds, said weight including the entire assembly and reactants other than the water. In the case of batteries employing a multiplicity of cells in hydraulic parallel (hereafter simply called parallel), each cell should be provided with an individual pump which forces the electrolyte into the cell through the inlet port, which inlet port is advantageously located at the bottom or lower part of the cell, and out through the outlet port which is advantageously located at or near the top of the cell. The electrolyte then returns through a pipe or conduit to the pump for recirculation through the cell. Fresh electrolyte is admitted, more or less continuously, to the suction side of the pump as required to maintain a desired output. The outlet port, as indicated above, is provided with an overflow line into which discharge spent electrolyte and cell gases automatically with the introduction of fresh electrolyte. The system also includes means for activating the cell or battery with an initial charge of fresh liquid electrolyte.

Referring, now, to the drawing, where an illustration cell and an illustrative cell system embodying said cell are disclosed, Fig. 1 is a schematic view of a cell system;

Fig. 4 is a section showing generally schematically a modified form of cell which may be used in the cell system.

The cell proper comprises outer walls 10 defining a relatively narrow chamber 11 within which are disposed the electrodes. The walls 10 are made from any suitable electrically nonconducting material which is inert to the electrolyte and to the reaction products formed in the cell chamber. In general, resins or plastics such as those of the phenol-formaldehyde type are satisfactory. The electrodes comprise, in the one case, a reducing metal electrode which may, for example, be zinc, magnesium, alloys of which the said metals are the predominating constituent, or other reducing metals. We have found that magnesium is outstandingly satisfactory, particularly in a pure form as, for instance, so-called cell grade magnesium. The other of the electrodes is made from an inert material, typical examples of which are graphite, platinized platinum or carbon. It is particularly advantageous to employ electrode graphite, such as that sold under the trade name "Stacpole HCX." The activity of the graphite can be augmented to a uniformly high performance by grooving or otherwise increasing its surface area, and this is best accomplished by such operations as tend to tear, rather than cut, the graphite so as to leave crystal faces with a preferential orientation exposed. A good active surface can also be obtained by sawing out the electrodes in the desired shape directly from the original blocks of the graphite.

Figure 3:
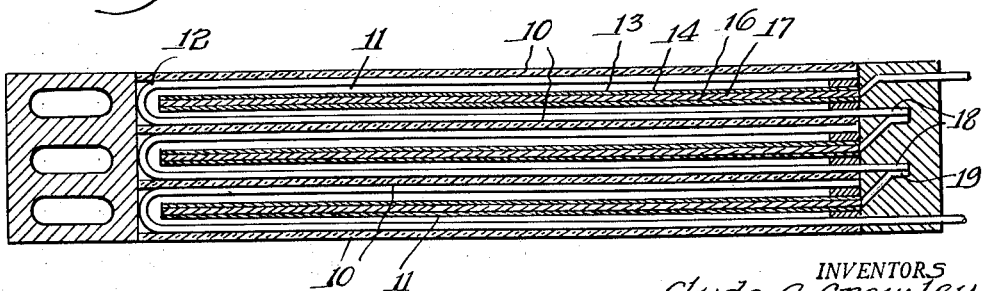
Fig. 3 is a section taken along the line 3—3 of Fig. 2 showing the arrangement of the cells and the electrodes therein.

It is particularly preferred, where a plurality of cells is arranged in parallel, as described hereafter, that the reducing metal electrode be U-shaped, as shown by numeral 12, and that the inert electrode be of sheet-like form, as shown by numeral 13, and disposed between the legs of the U and spaced therefrom, preferably at a distance of the order of about $\frac{1}{32}$ to about $\frac{1}{4}$ inch. It is desirable to form the inert electrode by taking two flat sheets of graphite, plating one of the flat surfaces of each sheet with copper or silver to a thickness of about 0.005 inch, soldering or otherwise bonding together the plated surfaces, planing the assembly to the desired thickness, and then grooving the exposed surfaces of the graphite. As is illustrated in Fig. 3, the unitary electrode 13 will be seen to be made of two sheets of graphite 14, 16 between which the copper or silver sheet 17 is disposed. A typical cell containing approximately 144 square inches each of reducing metal electrode surface and of inert electrode surface will, in usual operation, produce about 700 amperes. It is, generally speaking, advantageous to have the area of the two electrodes approximately the same. One edge of the graphite electrode is treated to remove the graphite therefrom so as to expose the copper or silver plate which is used as the inner cell connector. One leg of the U of each of the electrodes 12 is extended as shown at 18 to provide for the inter-cell connection to the extension 19 on the other electrode of the next adjacent cell. To provide rigid support to the cell structure, the graphite electrodes may have a number of holes, not shown, of $\frac{3}{8}$ inch diameter or thereabouts spaced about 2 inches apart, cut therethrough, and the reducing metal electrode may have buttons attached thereto preferably made of neoprene or an inert plastic, said buttons being so located as to extend through said holes. We have found it to be advantageous to utilize a double cell type of construction, where the cells are arranged in parallel, as shown more particularly in Fig. 3, since this permits a more practical cell width for use with the pumping connections, which latter are described hereafter. In other words, where a plurality of cells in parallel is employed, as will usually be the case, the intermediate walls serve as common walls for each of the immediately adjacent cells.

As shown schematically in Fig. 1, the cell system includes, in addition to the cell or battery of cells of the type described above, a water reservoir 21, a reservoir 22 for chromium trioxide, and a reservoir 23 for the inorganic acid as, for instance, hydrochloric acid, phosphoric acid, nitric acid, or sulfuric acid, as well as formic acid, acetic acid, and sulfamic acid which may be considered as inorganic acids. These acids are typical of those which, as previously stated, do not form protective coatings on the reducing metal electrode and which are not reduced nor reacted upon by chromium trioxide or chromic acid. For convenience, such acids are designated simply as nonreactive inorganic acids. The water reservoir 21 is connected through pipes 25, 26 to said reservoirs 22 and 23 through branch pipes 28 and 29, respectively. Discharge pipes 31, 32 and 33 lead into a common conduit 34, which may be or comprise a header or manifold in which the liquids discharging through said pipes 31, 32 and 33 commingle to form the electrolyte which is pumped into and through the cell or cells.

The reservoir 22 is preferably provided with a series of offset baffle plates and is charged with solid particles of chromium trioxide. The water passing therethrough generates a strong or substantially saturated chromic acid solution which is discharged through pipe 32.

The reservoir 23 comprises a rigid metal or other suitable container or housing within which is disposed a plastic or flexible bag 36 made of neoprene or the like and containing, in the particularly preferred embodiment of our invention, essentially water-free chlorsulfonic acid. Water passing into the reservoir 23 at a metered rate compresses the flexible bag 36 and displaces an amount of chlorsulfonic acid equivalent to the volume of water entering said reservoir, and said chlorsulfonic acid discharges through pipe 33. It will be noted that there is no commingling between the water in the reservoir 23 and the chlorsulfonic acid in the flexible bag 36.

The fresh electrolyte which forms as a result of the commingling of the water, the chromic acid solution, and the chlorsulfonic acid or the like passes into the cell through an inlet conduit 37 having a restricted inlet port 38, said inlet conduit and inlet port, as previously stated, being advantageously located at the bottom of the cell. The electrolyte, after being forced through the cell, discharges through the outlet port 39, which is best located at or near the top of the cell, and is continuously recirculated through cell by means of the pump 41 driven by a motor, not shown. Each cell, or battery of cells, is provided with an overflow conduit 42 and connecting pipe 43, said conduit 42 communicating with the cell interior through the restricted port 44 which is provided with a pressure controlled valve of conventional type, not shown. The valve may be set or adjusted to open at any suitable pressure, for example, 10 to 15 pounds per square inch, whereby, when said preset pressure is reached, the valve opens and electrolyte and cell gases are discharged through overflow conduit 42 and its connecting pipe 43.

A thermostatically controlled valve 46 of any conventional type is placed in the pipe line 31, the opening and closing of said valve being controlled through a thermostat of conventional construction denoted schematically by numeral 47 which is operatively associated with the interior of the cell through element 48 and connects to the valve through conductor wire 49. The cell reaction liberates a large amount of heat and, therefore, to regulate the cell temperature, a thermostatically controlled valve is utilized which permits sufficient water to enter the system so as to keep the cell temperature reasonably constant, below the boiling point of the electrolyte. In the usual case, operating the cell at atmospheric pressure, the cell temperature is regulated so as to maintain it at about 200 degrees F. If the cell is operated under greater than atmospheric pressure, the cell temperature can be maintained at higher values.

The amount of chlorsulfonic acid or the like fed into the system, as previously indicated, is controlled by the amount of water admitted to the reservoir 23 around the flexible bag 36. The admission of water to the reservoir is metered or regulated by voltage controlled valve 50 which is of conventional construction, the opening and closing of said valve being controlled by a voltage regulator or controller means 51, which may be of conventional construction, and which is connected to conductor 52 and across the power leads as shown in Fig. 1, and is set to operate in response to the voltage of the cell. The valve 53, which comprises an orifice valve of conventional type, controls the admission of water at a substantially constant rate to the reservoir 22 whereby the generated chromic acid solution is fed to the system at a regular controlled rate. The chlorsulfonic acid from bag 36 enters the cell in the amounts necessary to maintain the voltage at which the voltage controller is set.

It will be understood that when the cell is not being operated it is stored dried. To activate it, an initial charge of previously prepared and storaged electrolyte is passed into the cell. In the drawing, particularly Fig. 1, we have illustrated one convenient and satisfactory means for accomplishing this result. This means comprises a rigid metal or other suitable container or housing 54 within which is disposed a plastic or flexible bag 55 made of neoprene or the like containing the electrolyte which, for instance, may comprise an aqueous solution containing, by weight, 5 to 7% sulfuric acid, 2.5 to 4% hydrochloric acid, 4 to 8% $CrO_3$ (present as chromic acid), and preferably, in addition, 2 to 4% of an inorganic halide such as sodium chloride. Air from an air bottle 56 containing air under pressure, for instance of the order of 2500 to 3000 pounds per square inch, is released through reducing valve 57 into the housing 54, the air pressure in the housing 54 being of the order of 100 pounds per square inch above ambient pressure, whereby to force the liquid electrolyte out of the flexible bag 55 through the pipe 58, controlled by valve 59, and blow it into the cell through a conduit 60, which may comprise a header or manifold where a number of cells is utilized to form the battery, and through a restricted port 61. The port 61 of each cell is controlled by a one-way valve (not shown) which is conveniently a simple type of poppet valve of conventional type. This initial charge produces sufficient energy to start the circulating pump motor 62. Thereafter the cell will operate on its own power. The cell starts out on open circuit. After the voltage rises to the pre-set value, a solenoid (not shown) throws in the load circuit and the cell is then operated on closed circuit.

Figure 2:
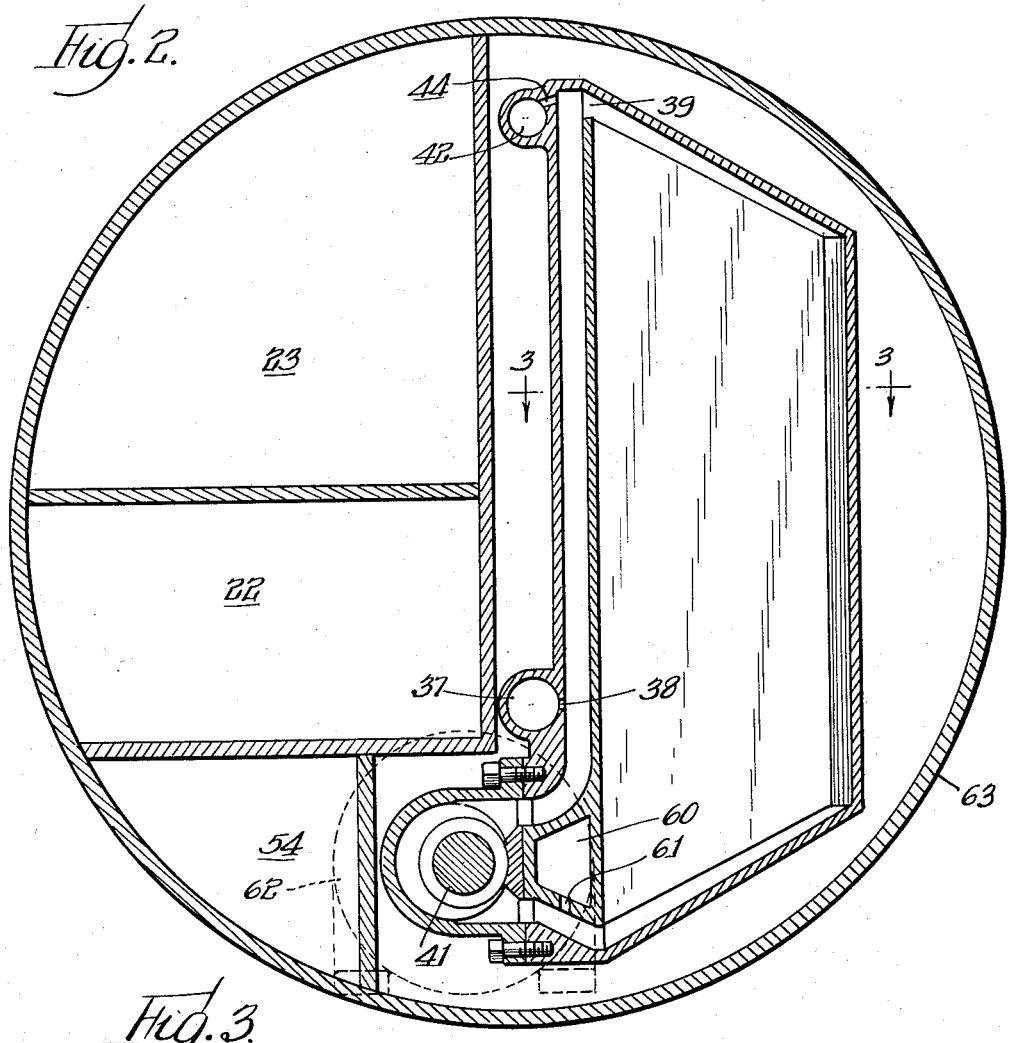
Fig. 2 is a vertical section taken through the cell proper and the housing, within which it may be supported, showing the reservoirs for the materials comprising the electrolyte.

The battery assembly can be located in such place or position as is indicated by the use to which it is to be put. In Fig. 2, we have, for convenience, shown it disposed within a cylindrical housing or casing 63.

The electrolyte which forms as a result of the commingling of the water (which may be tap water, distilled water or other waters including even sea water), the chromium trioxide and the chlorsulfonic acid, where the latter comprises the nonreactive inorganic acid, comprises an aqueous solution containing chromic acid, sulfuric acid and hydrochloric acid, it being understood, in this connection, that the chlorsulfonic acid reacts with the water to produce sulfuric acid and hydrochloric acid. The use of chlorsulfonic acid is especially desirable and represents an important, though limited, embodiment of our invention because it supplies, in easily contained liquid form, a large amount of hydrogen ion for a relatively small weight and volume of acid and, in addition, it supplies chloride ion which increases the activity of the magnesium electrode. While, of course, the composition of the electrolyte is variable, a typical fresh electrolyte feed which produces excellent results is one containing, by weight, about 6% sulfuric acid, about 2.7% hydrochloric acid, about 8% $CrO_3$ (present as chromic acid), and advantageously also about 2.3% sodium chloride (which may be derived from salt water or sea water) when the individual cells are operated at about 200 degrees F., at a voltage of about 1.5 volts, and with current drains of the order of 5 amperes per square inch of reducing metal electrode surface. If the cell is maintained at appreciably lower temperature as, for instance, by effective heat exchange means, say at about 150 to 175 degrees F., still more efficient operation can be achieved with fresh electrolyte feed containing substantially higher concentrations of $CrO_3$, for instance, 12% to 15% of $CrO_3$, with the acid concentration being increased correspondingly. The electrolyte is advantageously fed through the cell or cells at a linear velocity of at least several feet per second, generally at least about 5 feet per second and, more advantageously, up to 16 to 20 or more feet per second to achieve high current drains and power output.

We have found it to be particularly advantageous to use an internal gear type pump as the pump 41. Where the battery comprises a plurality of cells, each cell should be provided with its own pump, and the internal gear type pumps can be stacked up on a common driving shaft so that there is one pump opposite each cell. The battery cell case can conveniently be molded with all of the required ports and conduits so that the pumping unit can simply be clamped into proper position. Since the circulating lines act as current conductors with the pump and overflow lines acting as a dead short, the various conduit diameters and lengths in any particular cell system arrangement should be designed to reduce such parasitic losses to a minimum. The controlling factor is the friction drop and the corresponding power required to circulate the electrolyte.

In the particularly preferred embodiments of our invention, as stated above, the cells of the battery are arranged in parallel so that the electrolyte is pumped into all of the cells simultaneously and simultaneously discharged from the cells. It will, of course, be understood that the electrolyte can be pumped through a multiplicity of cells arranged in series, that is, the electrolyte is pumped from one cell into another and through the several cells comprising the battery before returning to the pump unit. The ports between the respective cells should be small enough, for example, of the order of about ⅜ inch more or less, so as to limit parasitic losses to within practical limits. It will be appreciated that the number of individual cells in hydraulic series is limited by the depletion of active oxidant in the electrolyte, the accumulation of gaseous end products, and the hydraulic pressure drop. Generally, not more than about 14 cells can satisfactorily be arranged in series and preferably not more than about 7 for better results, whereas the number of cells arranged in parallel can be materially greater, indeed unlimited except, of course, for practical considerations of space, etc. In Fig. 3, three cells have been shown, for convenience, in a parallel relationship.

In Fig. 4, we show a modified type of cell construction where a number of individual cells is arranged in hydraulic and electrical series. In this arrangement, which can be used in the system in place of the cells shown in Fig. 3, bipolar electrodes are utilized so that external intercell electrical connectors are eliminated. The bipole electrodes are conveniently formed, for example, by plating sheets of magnesium and graphite with a metal such as silver, zinc or copper and sweat soldering said sheets together. A multiplicity of cells is formed by stacking these bipoles together with spacing members or gaskets to allow for electrolyte circulation between opposing or facing surfaces of the magnesium and the graphite. Referring, now to Fig. 4, which shows such a cell in which the electrode thicknesses are in enlarged form for convenience of illustration, the cell comprises a frame 64 within which the cell elements are supported. The magnesium or other reducing metal electrode sheet 66 bears the electroplate 67 of silver, zinc or copper. The graphite or other inert electrode sheet 68 bears the electroplate 69 of zinc or copper. The bipole is formed, as stated, by sweat soldering the two sheets together. The bipole electrodes are spaced apart from each other in the frame 64 by means of gaskets or the like 71 to form chambers 72 through which the electrolyte is circulated. In Fig. 4, three bipole electrodes are shown although, of course, this may be increased if desired. Conduits or passageways 73, 74 and 75 are provided in the bipole electrodes so that electrolyte can be circulated through the chambers 72. In such a unit, of course, only one pump is needed to force the electrolyte through the several cells.

We have described our invention in detail hereinabove, with particular reference to its especially preferred embodiment. It will, however, be understood that, in its broader aspects the cell may be operated without the controller elements. In such case, the cell would be pre-set and orifice valves would be utilized for effecting the continuous admission of water and the continuous admission of nonreactive inorganic acid. After an initial rise in power output, under these conditions, there will be a progressive falling off in power output as a function of time of operation of the cell.

Over and above the significant advantages which have been described heretofore in relation to our present invention, it may also be noted that battery cells made in accordance with our invention possess the important attribute of enabling simple replacement of the electrodes and electrolyte when the original cell has outlived its usefulness. This permits substantial economies in use of the equipment over long periods of time.

What we claim as new and desire to protect by Letters Patent of the United States is:

1. A high drain primary battery comprising a cell which is provided with an inlet port and an outlet port, said cell having mounted therein a reducing metal electrode and an inert electrode spaced therefrom, individual reservoirs for water, a source of hexavalent chromium ions, and a nonreactive inorganic acid, a thermostatically controlled valve for controlling the admission of said water to said cell to regulate the temperature therein within desired limits, a voltage controlled valve for controlling the admission of said nonreactive inorganic acid to said cell in response to voltage delivered by said cell, means for commingling said water, said source of hexavalent chromium ions, and nonreactive inorganic acid to form the cell electrolyte before the admission thereof to said cell, a pump for pumping said electrolyte substantially continuously through the inlet port and out through the outlet port of said cell, means to recirculate said electrolyte through said pump and through said cell, means to introduce fresh electrolyte into said cell through said pump, and an overflow line operatively connected to said cell through which spent electrolyte and cell gases discharge.

2. A battery in accordance with claim 1, including means for activating said battery with an initial charge of liquid electrolyte, said means comprising a flexible bag containing said liquid electrolyte, said bag being disposed within a rigid housing, and a source of a gas under pressure for forcing said liquid electrolyte into said cell.

3. A high drain primary battery comprising a cell which is provided with a lower inlet port and an upper outlet port, said cell having mounted therein a reducing magnesium electrode and a graphite electrode spaced therefrom, individual reservoirs for water, chromium trioxide, and chlorsulfonic acid, a thermostatically controlled valve for controlling the admission of said water to said cell to regulate the temperature therein within desired limits, a voltage controlled valve for controlling the admission of said chlorsulfonic acid to said cell in response to voltage delivered by said cell, means for commingling said water, chromium trioxide and chlorsulfonic acid to form the cell electrolyte before the admission thereof to said cell, a pump for pumping said electrolyte substantially continuously through the inlet port and out through the outlet port of said cell, means to recirculate said electrolyte through said pump and through said cell, means to introduce fresh electrolyte into said cell through said pump, and an overflow line operatively connected to said cell through which spent electrolyte and cell gases discharge.

4. A high drain battery in accordance with claim 3, wherein the electrolyte comprises an aqueous solution containing, by weight, from about 5% to about 7% sulfuric acid, from about 2.5% to about 4% hydrochloric acid, and from about 4% to about 12% $CrO_3$ (present as chromic acid).

5. A high drain battery in accordance with claim 3 wherein the electrolyte comprises an aqueous solution containing, by weight, from about 5% to about 7% sulfuric acid, from about 2.5% to about 4% hydrochloric acid, from about 4% to about 12% $CrO_3$ (present as chromic acid), and from about 2% to about 4% sodium chloride.

6. A high drain primary battery comprising a plurality of cells connected together in parallel and each of which is provided with a lower inlet port and an upper outlet port, each of said cells having mounted therein a generally U-shaped reducing magnesium electrode and a grooved graphite sheet-like electrode spaced therefrom, individual reservoirs for water, chromium trioxide, and chlorsulfonic acid, a thermostatically controlled valve for controlling the admission of said water to said cells to regulate the temperature therein within desired limits, a voltage controlled valve for controlling the admission of said chlorsulfonic acid to said cells in response to voltage delivered by said cells, means for commingling said water, chromium trioxide and chlorsulfonic acid to form cell electrolyte before the admission thereof to said cells, a pump for each said cell for pumping the electrolyte substantially continuously through the inlet port and out through the outlet port of each said cell, means to recirculate said electrolyte through said pump and through said cells, means to introduce fresh electrolyte into said cells through said pumps, and an overflow line operatively connected to said cells through which spent electrolyte and cell gases discharge.

7. A battery in accordance with claim 6, including means for activating said battery with an initial charge of liquid electrolyte, said means comprising a flexible bag containing said liquid electrolyte, said bag being disposed within a rigid housing, and a source of a gas under pressure for forcing said liquid electrolyte into said cell.

8. A high drain primary battery comprising a plurality of interconnected and adjoining cells each of which is provided with an inlet port and an outlet port, each said cell having mounted therein a generally U-shaped reducing magnesium electrode and a grooved graphite sheet-like electrode spaced therefrom, individual reservoirs for water, chromium trioxide and chlorsulfonic acid, a conduit connected to said reservoirs and leading to said cells, a thermostatically controlled valve responsive to the temperature of said cells for controlling the admission of water to said conduit, a voltage controlled valve for controlling the admission of chlorsulfonic acid to said conduit in response to voltage delivered by said cells, a pump for each said cell for pumping the electrolyte which is formed in said conduit whereby to force said electrolyte substantially continuously through the inlet port and out through the outlet port of each of said cells, means to recirculate said electrolyte through said pump, means to introduce fresh electrolyte into said cells through said pump, and an overflow line operatively connected to said cells through which spent electrolyte and cell gases discharge.

9. A high drain primary battery comprising a cell which is provided with a lower inlet port and an upper outlet port, said cell having mounted therein a generally U-shaped reducing magnesium electrode and a grooved graphite sheet-like electrode spaced therefrom about $\frac{1}{32}$ to about ¼ inch and disposed between the legs of the U, individual reservoirs for water, chromium trioxide, and chlorsulfonic acid, means for commingling said water, chromium trioxide and chlorsulfonic acid to form cell electrolyte, a thermostatically controlled valve for controlling the admission of said water to said cell to regulate the temperature therein within desired limits, a voltage controlled valve for controlling the admission of said chlorsulfonic acid to said cell in response to voltage delivered by said cell, a pump for said cell for pumping the cell electrolyte substantially continuously through the inlet port and out through the outlet port of said cell, means to recirculate said electrolyte through said pump and through said cell, means to introduce fresh electrolyte into said cell through said pump, and an overflow line operatively connected to said cell through which spent electrolyte and cell gases discharge.

References Cited in the file of this patent

UNITED STATES PATENTS

| | | |
|---|---|---|
| 425,959 | Renard | Apr. 15, 1890 |
| 734,549 | Halsey | July 28, 1903 |
| 940,734 | Sandy | Nov. 23, 1909 |
| 2,306,408 | Ruben | Dec. 29, 1942 |
| 2,639,306 | Fischbach | May 19, 1953 |

FOREIGN PATENTS

| | | |
|---|---|---|
| 12,818 | Great Britain | June 15, 1908 |